Patented Feb. 26, 1952

2,586,830

UNITED STATES PATENT OFFICE 2,586,830

MANUFACTURE OF BAKERS' CHEESE

Martin M. Kloser, Chicago, Timothy L. Kimball, Park Ridge, and Otto J. Schrenk, Chicago, Ill., assignors to Bowman Dairy Company, Chicago, Ill., a corporation of Illinois No Drawing. Application March 31, 1949, Serial No. 84,734

7 Claims. (Cl. 99—116)

This invention relates to the manufacture of bakers' cheese. The invention is also applicable to other uses.

Under present practice bakers' cheese is made in substantially the following manner:

Pasteurized skim milk is placed in a cheese vat and cooled to about 78° F.; starter and rennet are then added and the mixture is allowed to "ripen" at about 82° F. until a desired acidity is reached. The curd is then cut, the whey drained off, and, after the curd has been washed with cold water, it is pressed to remove moisture either in a cheese press or in sacks stacked in a vat or hung over the edge thereof. The curd thus pressed is so-called bakers' cheese.

The cheese produced in the above method is by no means uniform with regard to moisture content and it is frequently gritty and of unsatisfory texture. The large pieces of the curd do not cool readily in being washed, and since they often remain warm, bacterial growth is promoted. The product is frequently contaminated because of an unsanitary cheese press or sack. The quality of the product is not satisfactory.

An object of the present invention is to provide a process for the preparation of the cheese whereby the cheese has much improved texture, is more uniform throughout and has better keeping qualities. A further object is to provide a method for the preparation of cheese characterized by its being free from grittiness and of a uniformly smooth texture while at the same time being relatively free from contamination by undesirable bacteria. Yet another object is to provide a method by which bakers' cheese can be produced more readily, at less expense while producing a far superior product. Other specific objects and advantages will appear as the specification proceeds.

In one embodiment of the invention, the skim milk is pasteurized, cooled to about 78° F. and allowed to ripen after the addition of starter and rennet. To this extent the process is substantially the same as that heretofore employed. However, in the new process it is no longer necessary to use an open vat as heretofore required but instead any type of tank or vat whether open or closed may be used. It is no longer necessary to cut the curd.

After the mixture has ripened it is chilled to a substantial degree and preferably to a temperature below 65° F. We have found that temperatures between freezing and ranging up to 60° or 65° F. are satisfactory. The chilling step is important for without chilling the filter cloths used in the ensuing operation will become plugged.

There is not cutting of the curd. After the chilling operation, the mixture is pumped into a filter press, the pumping being carried out at low pressure. We prefer to employ pressures less than 35# per square inch. Higher pressure causes matting of the filter cloths and make it substantially impossible to remove the curd later.

When the filter press is filled the mixture is shut off and cold water is run into the press to wash the curd. It is important here also that the pressure of the water does not exceed 35# per square inch, and lower pressures are desirable.

The pumping of cold water may be discontinued after about five minutes. If desired, the pumping may be continued for a longer time but it is usually found that the curd is washed satisfactorily after this period. After the water is turned off an air hose is connected to the filter press and cool clean air is passed into the press under the same low pressures that prevailed in the preceding steps, the air pressure being kept below 35# per square inch, with the preferred pressures substantially lower. The air reduces the moisture content of the curd. Air is preferably pumped into the filter until the filtrate becomes foamy with white bubbles. Pumping is then discontinued and the filter press plates taken apart and the curd removed.

If desired, water may then be added to the curd in a blending machine to bring the moisture content to the desired point. The resulting cheese product is characterized by its uniformity throughout, its smooth texture and freedom from grittiness, freedom from undesirable contaminating bacteria, and its high quality in taste.

Example

As a specific example, the following may be set out:

Skim milk was flash-pasteurized and placed in a vat and cooled to about 78° F. Starter and rennet were added and the mixture allowed to ripen. After ripening, the mixture was run through a conventional cooling coil and cooled to about 42° F.

The cooled mixture was pumped into a thirty-plate filter press having 26" x 26" plates at a pressure of about 20 pounds per square inch. A conventional milk pump was used for this purpose. A milk pump having a capacity of 14,000 pounds per hour will fill such a press in about an hour (the initial capacity of the pump will not be maintained, for as the press fills the capacity diminishes, and at the end of the hour will approximate 900 pounds per hour).

When the filter press was filled, the milk mixture was turned off and cold, pure water was pumped, at a pressure of about 20 pounds per square inch, into the press for about five minutes.

After the water was shut off, an air line was connected to the filter press. Cold, filtered air was pumped into the press until the filtrate became foamy with white air bubbles. (At this point the curd had a moisture content of about 70% to 72%.) Cold, clean air was used to prevent contamination and inhibit the growth of such bacteria as were present. The air pressure was maintained at about 20 pounds per square inch; substantially lower pressure will require more time, while higher pressure will cause the undesirable matting of the curd on the cloths.

Filter plates were finally taken apart and the curd was removed with paddles. It should fall away readily if the operations have been properly performed. Moisture will be unevenly distributed, since the curd nearest the apertures in the filter plates will be found to be more moist than that farther away. To provide a uniform product, the curd was placed in a blending machine like a baker's dough mixer and agitated therein. Water was added until the moisture content was about 77% or 78%.

In the process as described herein, it will be observed that the curd after being chilled in the initial step is never allowed to get warm nor is it subjected to a pressure of more than 30 to 35 pounds per square inch, up to the final step of removing the curd from the filters. These tests show that by forcing out of the curd in the filter press a maximum amount of whey and then subsequently adding pure water to achieve the proper moisture content, a product is obtained which is far superior in taste and baking quality to that obtained in present practice in which the whey is allowed to remain or one in which whey is first removed and later replaced.

In the new process it has been found unnecessary to change the filter cloths between runs; an entire batch of milk mixture may be run through the press without changing the cloth.

While in the foregoing specification we have set forth specific steps illustrating an embodiment of the invention, it will be understood that such details may be varied widely by those skilled in the art without departing from the spirit of our invention.

We claim:

1. In a process for preparing bakers' cheese in which milk is coagulated to form curd and whey, the steps of cooling the material to a temperature below 65° F., pumping the material into a filter press at a pressure of less than 35 pounds per square inch, pumping cool water through the press, passing cool air through the press to reduce the moisture content of the curd, and then removing the curd from the press.

2. In a process for preparing bakers' cheese in which milk is coagulated to form curd and whey, the steps of cooling the material to a temperature below 65° F., pumping the material into a filter press at a pressure of less than 35 pounds per square inch, pumping cool water through the press, passing cool air through the press to reduce the moisture content of the curd, and then removing the curd from the press, all of said steps up to the step of removal of the curd being carried out at a temperature between freezing and 65° F.

3. In a process for preparing bakers' cheese in which milk is coagulated to form curd and whey, the steps of cooling the material to a temperature below 65° F., pumping the material into a filter press, pumping cool water through the press, passing cool air through the press to reduce the moisture content of the curd, and then removing the curd from the press, all of said steps up to the step of removal of the curd being carried out at a temperature between freezing and 65° F. and at a pressure below 35 pounds.

4. In a process for preparing bakers' cheese in which milk is ripened and coagulated to form curd and whey, the steps of cooling said material below 65° F., pumping the curd uncut together with whey into a filter press, pumping cool water through the press, pumping cool air through the press to reduce the moisture content of the curd, all of said pumping operations being at pressures below 35 pounds, and then removing the curd from the press.

5. In a process for preparing bakers' cheese in which milk is ripened and coagulated to form curd and whey, the steps of cooling said material below 65° F., pumping the curd uncut together with whey into a filter press, pumping cool water through the press, pumping cool air through the press to reduce the moisture content of the curd, all of said pumping operations being at pressures of about 20 pounds per square inch.

6. In a process for preparing bakers' cheese in which milk is coagulated to form curd and whey material, the steps of cooling said material to a temperature below 65° F., pumping the material into a filter press under pressures below 35 pounds, pumping cool water through the press, pumping cool air through the press to reduce the moisture content of the curd to about 70%, and then adding water to bring the moisture of the curd to about 77%.

7. In a process for preparing bakers' cheese in which pasteurized milk is ripened and coagulated to form curd and whey material, the steps of cooling the material to a temperature below 65° F., pumping the material into a filter press at pressures below 35 pounds until the press is filled, pumping cool water through the press at pressures below 35 pounds, pumping cool air through the press at pressure below 35 pounds to reduce the moisture content of the curd below the desired final moisture content, removing the curd from the press and adding water thereto to raise the moisture content thereof to the desired content.

MARTIN M. KLOSER.
TIMOTHY L. KIMBALL.
OTTO J. SCHRENK.

REFERENCES CITED

The following references are of record in the file of this patent:

UNITED STATES PATENTS

| Number | Name | Date |
|---|---|---|
| 567,522 | Turner | Sept. 8, 1896 |
| 1,159,808 | Spencer et al. | Nov. 9, 1915 |
| 2,349,969 | Kremers | May 30, 1944 |
| 2,415,239 | Flowers | Feb. 4, 1947 |
| 2,494,637 | Stine | Jan. 17, 1950 |